(12) United States Patent
Holford et al.

(10) Patent No.: US 11,253,922 B2
(45) Date of Patent: Feb. 22, 2022

(54) METHOD FOR REAL-TIME SIMULTANEOUS AND CALIBRATED ADDITIVE AND SUBTRACTIVE MANUFACTURING

(71) Applicant: GENERAL ELECTRIC COMPANY, Schenectady, NY (US)

(72) Inventors: Brandon Holford, West Chester, OH (US); Jeffrey Vaught, West Chester, OH (US); MacKenzie Ryan Redding, Mason, OH (US); Justin Mamrak, Loveland, OH (US)

(73) Assignee: General Electric Company, Schenectady, NY (US)

( * ) Notice: Subject to any disclaimer, the term of this patent is extended or adjusted under 35 U.S.C. 154(b) by 900 days.

(21) Appl. No.: 15/610,214

(22) Filed: May 31, 2017

(65) Prior Publication Data

US 2018/0345373 A1    Dec. 6, 2018

(51) Int. Cl.
*B22F 3/105*    (2006.01)
*B33Y 10/00*    (2015.01)
(Continued)

(52) U.S. Cl.
CPC .............. *B22F 10/20* (2021.01); *B22F 5/009* (2013.01); *B22F 5/04* (2013.01); *B22F 5/106* (2013.01);
(Continued)

(58) Field of Classification Search
CPC ........... B22F 12/30; B22F 12/33; B22F 12/37
See application file for complete search history.

(56) References Cited

U.S. PATENT DOCUMENTS

| 5,239,901 A | 8/1993 | Lin |
| 5,373,222 A | 12/1994 | Hemmerle et al. |

(Continued)

FOREIGN PATENT DOCUMENTS

| CN | 104245284 A | 12/2014 |
| CN | 105479743 A | 4/2016 |

(Continued)

OTHER PUBLICATIONS

Combined Chinese Office Action and Search Report Corresponding to Application No. 201810549617 dated Aug. 3, 2020.

*Primary Examiner* — Anthony M Liang
(74) *Attorney, Agent, or Firm* — Dority & Manning, P.A.

(57) ABSTRACT

A method for large-scale, real-time simultaneous additive and subtractive manufacturing is described. The apparatus used in the method includes a build unit and a machining mechanism that are attached to a positioning mechanism, a rotating platform, and a rotary encoder attached to the rotating platform. The method involves rotating the build platform; determining the rotational speed; growing the object and the build wall through repetitive cycles of moving the build unit(s) over and substantially parallel to multiple build areas within the build platform to deposit a layer of powder at each build area, leveling the powder, and irradiating the powder to form a fused additive layer at each build area; machining the object being manufactured; and cutting and removing the build wall. The irradiation parameters are calibrated based on the determined rotational speed.

20 Claims, 9 Drawing Sheets

(51) Int. Cl.

| | | |
|---|---|---|
| *B33Y 30/00* | (2015.01) | |
| *B33Y 80/00* | (2015.01) | |
| *B33Y 40/00* | (2020.01) | |
| *B22F 5/00* | (2006.01) | |
| *B22F 5/04* | (2006.01) | |
| *B23K 15/00* | (2006.01) | |
| *B33Y 50/02* | (2015.01) | |
| *B23K 26/342* | (2014.01) | |
| *B23K 26/70* | (2014.01) | |
| *B23K 26/08* | (2014.01) | |
| *F01D 25/24* | (2006.01) | |
| *F23R 3/00* | (2006.01) | |
| *B22F 10/20* | (2021.01) | |
| *B23K 26/14* | (2014.01) | |
| *B23K 26/144* | (2014.01) | |
| *B22F 5/10* | (2006.01) | |
| *B23K 101/00* | (2006.01) | |
| *F01D 5/22* | (2006.01) | |
| *B22F 10/30* | (2021.01) | |

(52) U.S. Cl.
CPC ........ *B23K 15/002* (2013.01); *B23K 15/0086* (2013.01); *B23K 26/0823* (2013.01); *B23K 26/144* (2015.10); *B23K 26/1476* (2013.01); *B23K 26/342* (2015.10); *B33Y 10/00* (2014.12); *B33Y 30/00* (2014.12); *B33Y 40/00* (2014.12); *B33Y 50/02* (2014.12); *B33Y 80/00* (2014.12); *B22F 10/30* (2021.01); *B22F 2998/10* (2013.01); *B23K 2101/001* (2018.08); *F01D 5/225* (2013.01); *F01D 25/24* (2013.01); *F05D 2230/22* (2013.01); *F05D 2230/31* (2013.01); *F05D 2240/11* (2013.01); *F05D 2240/60* (2013.01); *F05D 2250/141* (2013.01); *F05D 2250/231* (2013.01); *F23R 2900/00018* (2013.01)

(56) References Cited

U.S. PATENT DOCUMENTS

| | | |
|---|---|---|
| 5,751,586 A | 5/1998 | Grabovac |
| 6,326,585 B1 | 12/2001 | Stephen et al. |
| 9,192,999 B2 | 11/2015 | Carter et al. |
| 2008/0317951 A1 | 12/2008 | Green |
| 2011/0297081 A1* | 12/2011 | Green .................. B33Y 30/00 118/641 |
| 2013/0264750 A1 | 10/2013 | Hofacker et al. |
| 2015/0306819 A1* | 10/2015 | Ljungblad ............ B29C 64/268 419/55 |
| 2016/0179064 A1 | 6/2016 | Arthur et al. |
| 2016/0184891 A1* | 6/2016 | Mironets ............... B22F 1/0096 419/53 |
| 2016/0222807 A1* | 8/2016 | Liebl ....................... F01D 9/04 |
| 2017/0008127 A1 | 1/2017 | Hyatt et al. |
| 2017/0100898 A1* | 4/2017 | Cofler .................. B33Y 10/00 |

FOREIGN PATENT DOCUMENTS

| | | |
|---|---|---|
| KR | 20140056815 A | 5/2014 |
| KR | 101453543 B1 | 10/2014 |
| WO | WO2014/195068 A1 | 12/2014 |
| WO | WO2016/096407 A1 | 6/2016 |

* cited by examiner

METHOD FOR REAL-TIME SIMULTANEOUS AND CALIBRATED ADDITIVE AND SUBTRACTIVE MANUFACTURING

INTRODUCTION

The present disclosure generally relates to apparatuses and methods for additive and subtractive manufacturing. More specifically, the present disclosure relates to apparatuses and methods that enable real-time simultaneous additive and subtractive manufacturing on a large-scale format. These apparatuses and methods are useful but are not limited to the manufacturing of components of an aircraft engine.

BACKGROUND

Additive manufacturing (AM) encompasses a variety of technologies for producing components in an additive, layer-wise fashion. In powder bed fusion which is one of the most popular AM technologies, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Referring to FIG. 1, a laser powder bed fusion system such as the system 100 includes a fixed and enclosed build chamber 101. Inside the build chamber 101 is a build plate 102 and an adjacent feed powder reservoir 103 at one end and an excess powder receptacle 104 at the other end. During production, an elevator 105 in the feed powder reservoir 103 lifts a prescribed dose of powder to be spread across the build surface defined by the build plate 102 using a recoater blade 106. Powder overflow is collected in powder receptacle 104, and optionally treated to sieve out rough particles before re-use.

Selected portions 107 of the powder layer are irradiated in each layer using, for example, laser beam 108. After irradiation, the build plate 102 is lowered by a distance equal to one layer thickness in the object 109 being built. A subsequent layer of powder is then coated over the last layer and the process repeated until the object 109 is complete. The laser beam 108 movement is controlled using galvo scanner 110. The laser source (not shown) may be transported from a laser source (not shown) using a fiber optic cable. The selective irradiation is conducted in a manner to build object 109 an accordance with computer-aided design (CAD) data.

Powder bed technologies have demonstrated the best resolution capabilities of all known metal additive manufacturing technologies. However, since the build needs to take place in the powder bed, the size of object to be built is limited by the size of the machine's powder bed. Increasing the size of the powder bed has limits due to the needed large angle of incidence that can lower scan quality, and weight of the powder bed which can exceed the capabilities of steppers used to lower the build platform. In view of the foregoing, there remains a need for manufacturing apparatuses and methods that can handle production of large objects with improved precision and in a manner that is both time- and cost-efficient with a minimal waste of raw materials.

SUMMARY

In an aspect, the present invention provides a large-scale manufacturing apparatus that includes at least a build unit, a rotating build platform and a machining mechanism. The build unit includes a powder delivery mechanism, a powder recoating mechanism and an irradiation beam directing mechanism with either a laser source or an electron source. The machining mechanism is configured to carry one or more material removal processes, e.g. cutting, tapping, tooling, drilling, chamfering, abrading, forming, grinding, shaping and knurling, etc. Preferably, these material removal processes are automated by computer numerical control.

In some embodiments, the large-scale manufacturing apparatus further includes a positioning mechanism that is configured to provide movement of the build unit and preferably, also the machining mechanism.

In some embodiments, the large-scale manufacturing apparatus further includes a powder recovery mechanism that scrapes powder overflow built up on the outside of an outer wall surrounding a built object into a powder receptacle.

In another aspect, the present invention relates to a method of manufacturing at least one object with a manufacturing apparatus described herein. The method includes the steps of: (a) rotating a build platform; (b) depositing powder from at least one build unit, wherein the at least one build unit comprises a powder delivery mechanism, a powder recoating mechanism and an irradiation beam directing mechanism; (c) irradiating at least one selected portion of the powder to form at least one fused layer and or a build wall; (d) repeating at least steps (b) and (c) to form the at least one object, and machining at least a portion of the fused layer or build wall.

In some embodiments, the method further includes a step of removing at least a portion of the build wall by rotational machining.

In some embodiments, at least the powder delivery mechanism and irradiation beam directing mechanism are calibrated based on a measured rotational speed of the build platform.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. For example, the present invention provides a preferred method for manufacturing certain components of metal objects, and preferably these components and these objects are used in the manufacture of jet aircraft engines. In particular, large, annular components of jet aircraft engines can be advantageously produced in accordance with this invention. However, other components of an aircraft may be prepared using the apparatuses and methods described herein.

The present invention provides an apparatus and embodiments of the apparatus that can be used to perform real-time simultaneous powder-based additive layer manufacturing and machining of the additively built object. Examples of powder-based additive layer manufacturing include but are not limited to selective laser sintering (SLS), selective laser melting (SLM), direct metal laser sintering (DMLS), direct metal laser melting (DMLM) and electron beam melting (EBM) processes.

The term "machining" as used herein refers to any of various processes in which a piece of object that is being additively manufactured (i.e. additive manufacturing in progress) is cut into a desired final shape and size by a controlled material removal process. Examples of these processes include but are not limited to cutting (including finishing cutting and heavy cutting), tapping, milling (including x-axis milling and c-axis milling), tooling, drilling, abrading, forming, grinding, shaping and knurling, which are collectively known as "subtractive manufacturing". Preferably, these material removal processes are carried out by computer numerical control (CNC), in which computers are used to control the movement and operation of the mills, lathes and other suitable cutting machines. The present invention also includes methods for utilizing the apparatus or an embodiment thereof to manufacture objects. The apparatus of the present invention includes components that make it particularly useful for making large objects that are substantially annular or cylindrical, such as annular or cylindrical components of an aircraft engine or an aircraft body. Examples of such aircraft components are turbine or vane shroudings, central engine shaft, casings, compressor liners, combustor liners, ducts, etc. In some instances, these components can have a radius of up to 2 meter.

Figure 1:
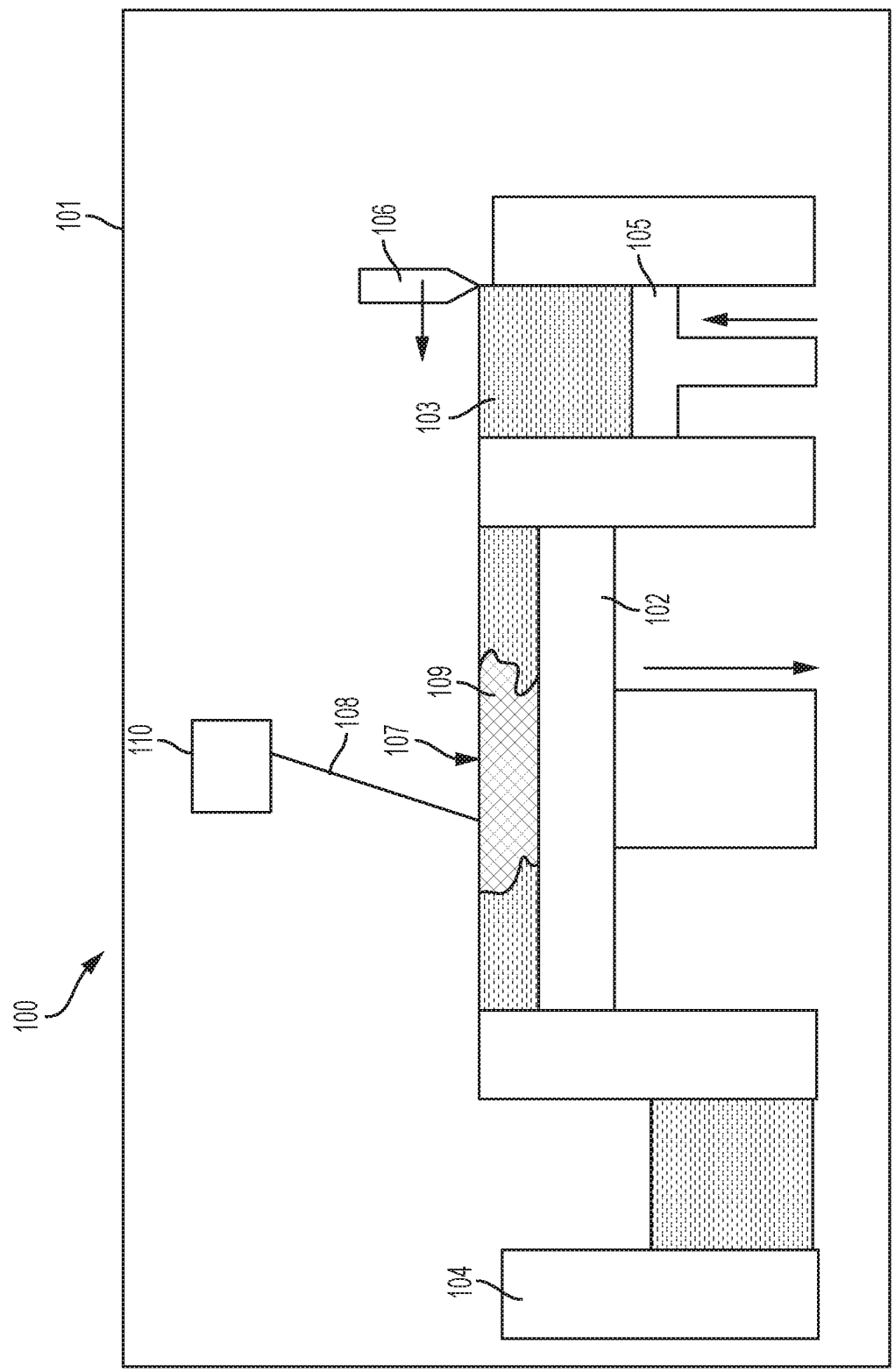
FIG. 1 shows an exemplary prior art powder-based system for additive manufacturing.
Figure 2A:
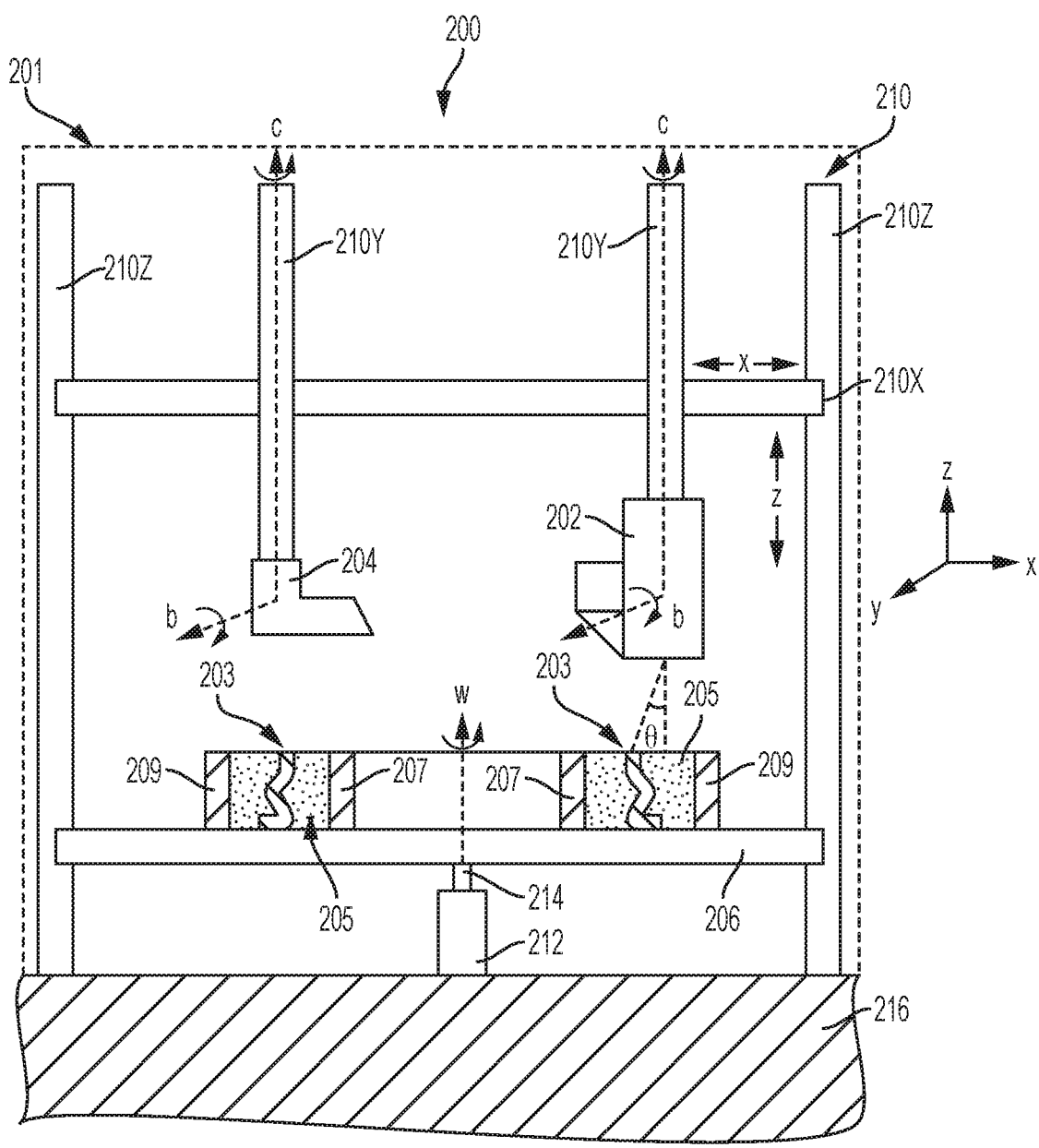
FIG. 2A is a schematic diagram showing the front view of a manufacturing apparatus according an embodiment of the invention.
Figure 2B:
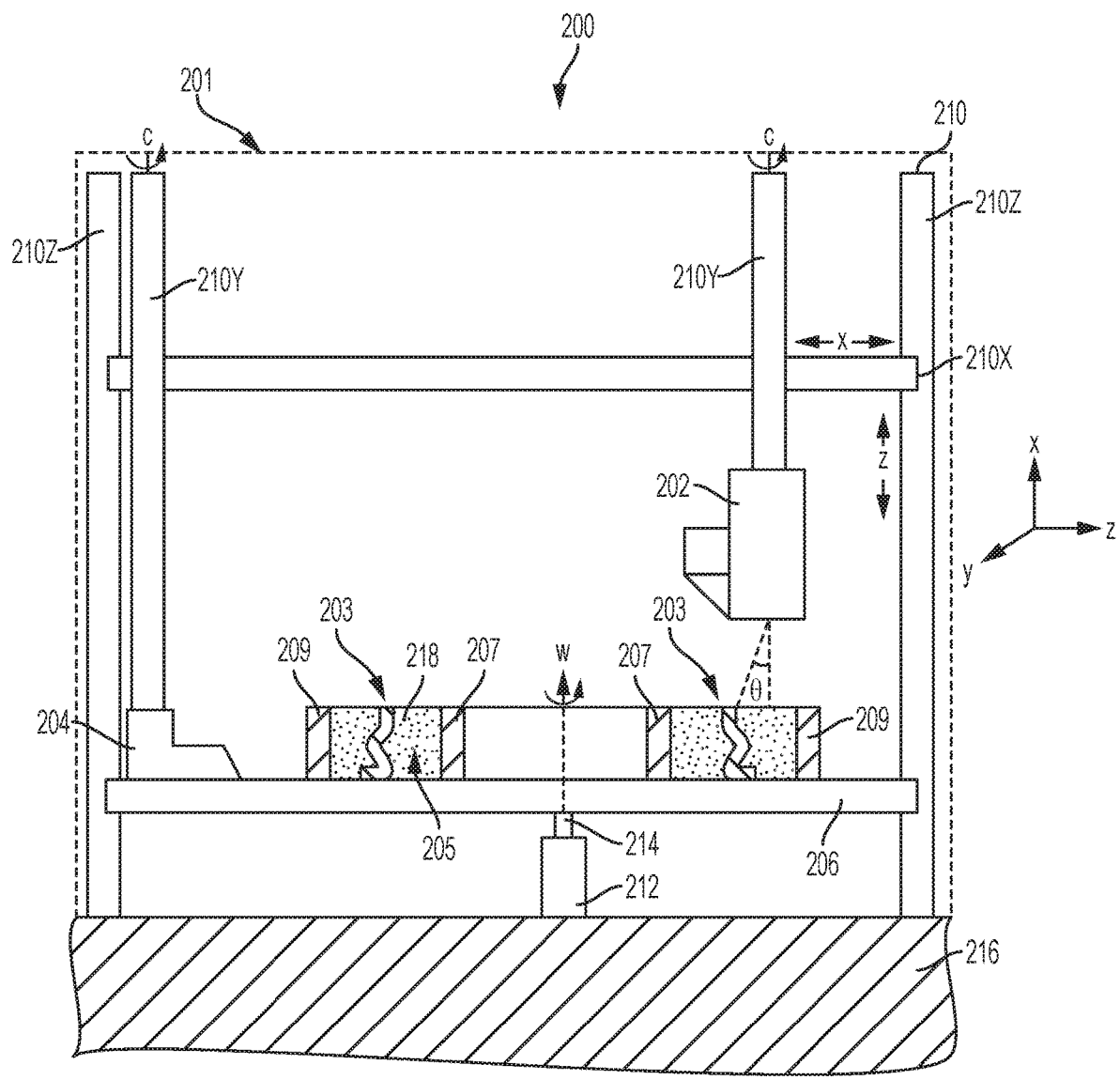
FIG. 2B is a front view of the manufacturing apparatus of FIG. 2A where a machining mechanism is positioned to cut through at least a portion of the outer build wall.
Figure 2C:
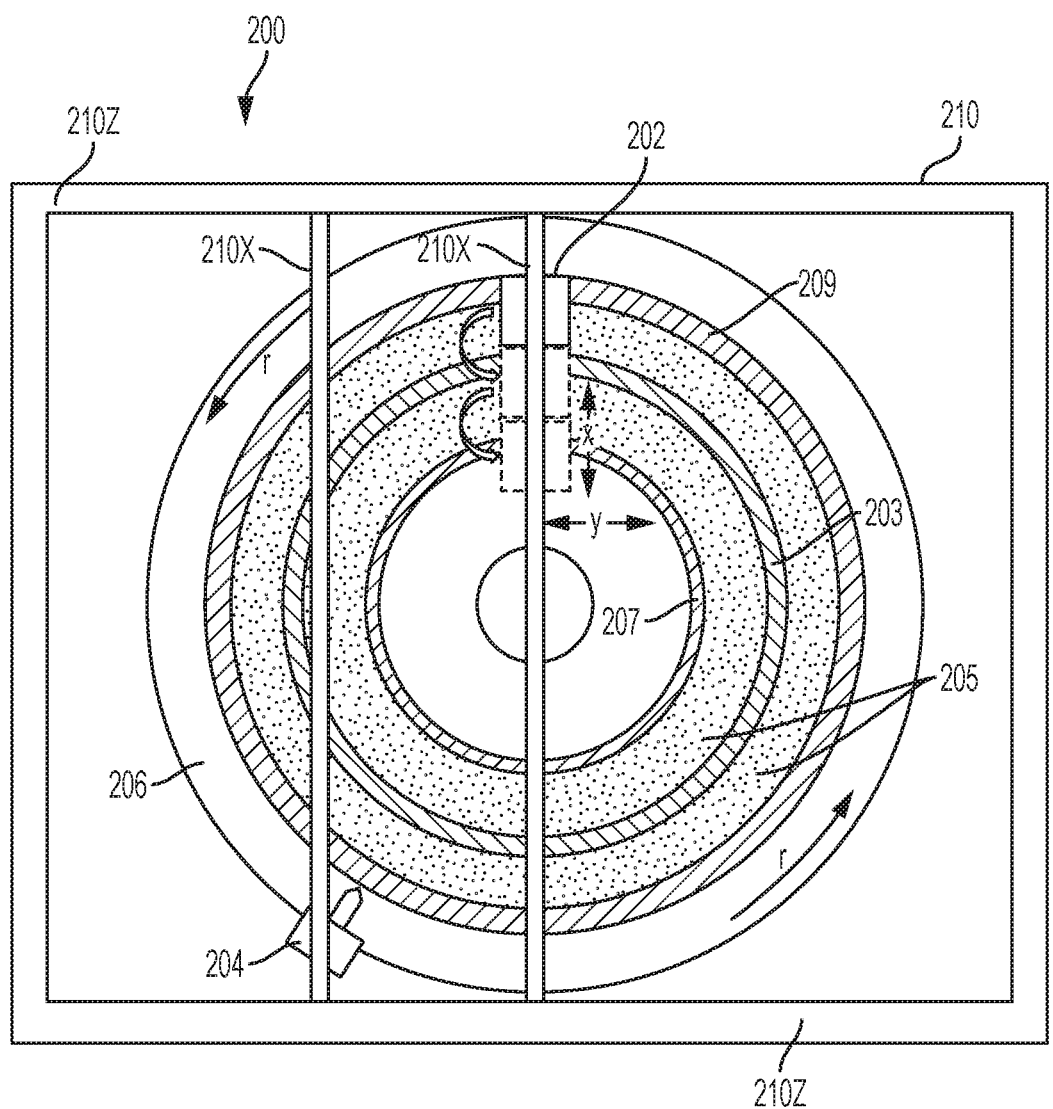
FIG. 2C is a top view of the manufacturing apparatus of FIG. 2A.

FIGS. 2A-2C depict schematic representations of a manufacturing apparatus 200 of an embodiment of the present invention. The apparatus 200 may include a build enclosure 201 housing the entire apparatus 200 and object 203 to be built. The apparatus 200 includes a build unit 202, a machining mechanism 204, and a rotating build platform 206. During operation, the apparatus builds an object 203 in a powder bed 205 formed between outer grown build envelope 209 and, in many cases, inner build envelope 207. Preferably, the object 203 is a large annular shaped object, such as, but not limited to, a turbine or vane shrouding, a central engine shaft, a casing, a compressor liner, a combustor liner, a duct, etc.

Figure 4:
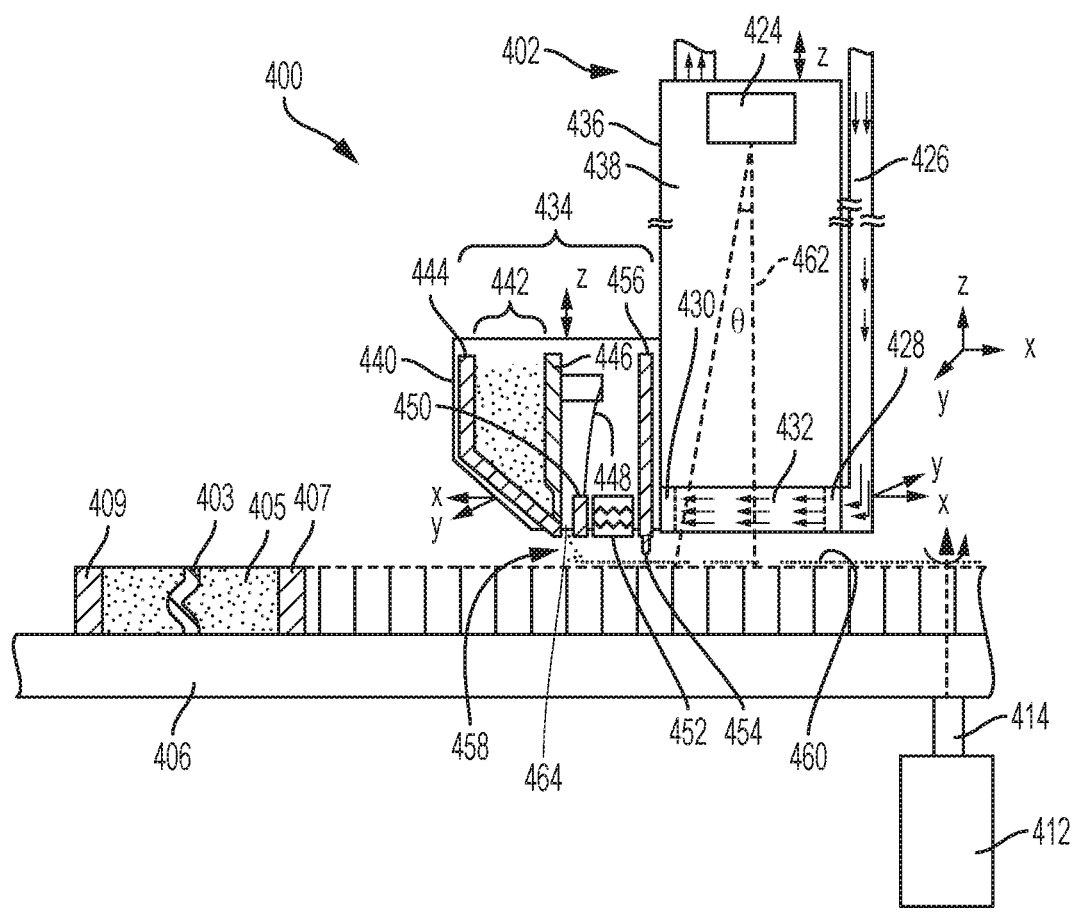
FIG. 4 is an expanded view of the build unit, machining mechanism, and part of the rotating build platform of the large-scale additive manufacturing apparatus of FIG. 2A.
Figure 5:
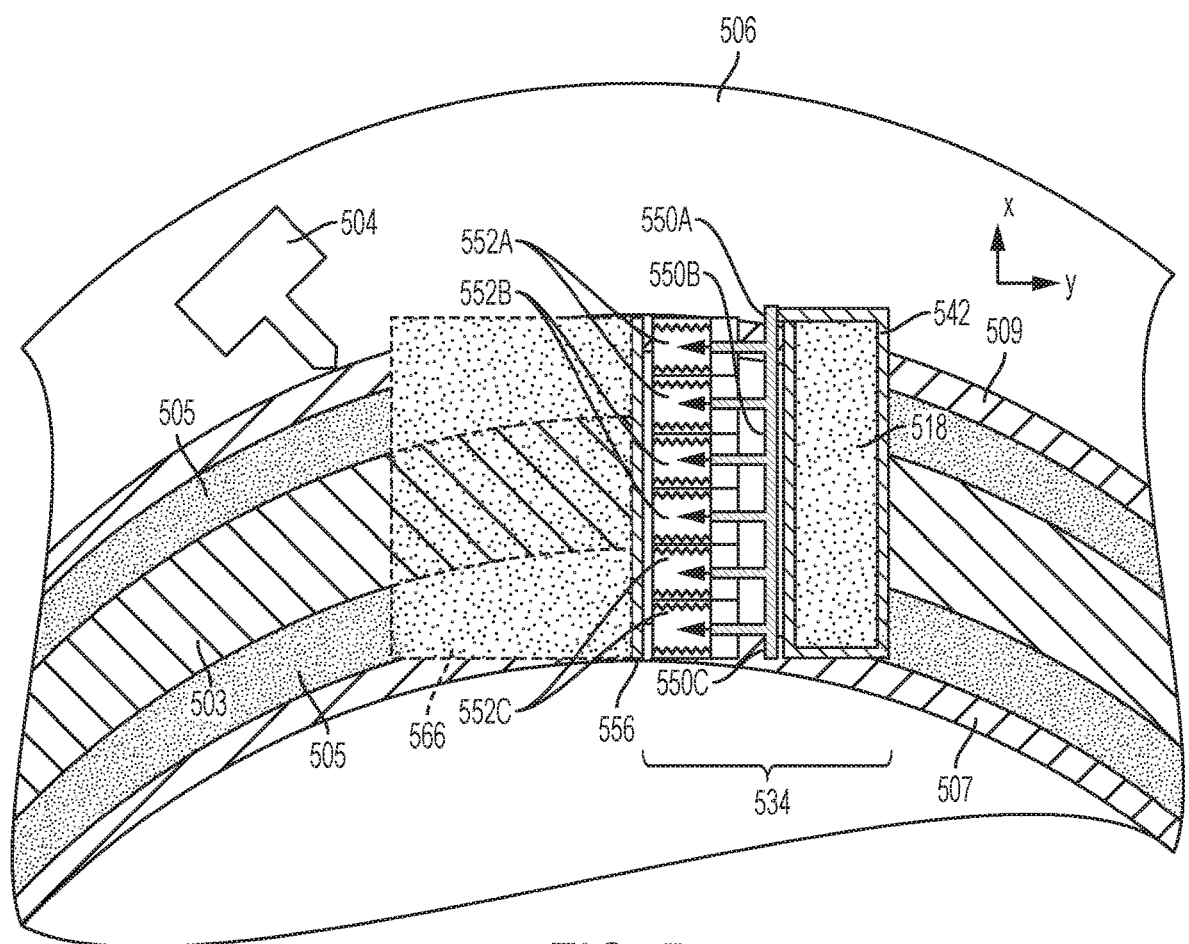
FIG. 5 is a top view of a large-scale manufacturing apparatus having a selective recoating mechanism according to an embodiment of the invention.

The build unit 202 may be configured to include several components for additively manufacturing a high-precision, large-scale object or multiple smaller objects. A mobile build unit may include, for example, a powder delivery mechanism, a powder recoating mechanism, a gas-flow mechanism with a gas-flow zone and an irradiation beam directing mechanism. FIGS. 4-5 include additional details of an exemplary mobile build unit to be used in accordance with the present invention.

The positioning mechanism 210 may be an X-Y-Z gantry has one or more x-crossbeams 210X (one shown in FIGS. 2A and 2B, two shown FIG. 2C) that independently move the build unit 202 and the machining mechanism 204 along the x-axis (i.e. left or right), one or more y-crossbeams 210Y (two shown in FIG. 2C) that respectively move the build unit 202 and the machining mechanism 204 along the y-axis (i.e. inward or outward). Such two-dimensional movements across the x-y plane are substantially parallel to the build platform 206 or a build area therewithin. Additionally, the positioning mechanism 210 has one or more z-crossbeams 210Z (two shown in FIGS. 2A-2C) that moves the build unit 202 and the machining mechanism 204 along the z-axis (i.e. upward and downward or substantially perpendicular to the build platform 206 or a build area therewithin). The build unit 202 and machining mechanism 204 may be mounted on the same or different crossbeam, and may be moved independently of each other. The positioning mechanism 210 is further operable to rotate the build unit 202 around the c-axis and also the b-axis. The positioning mechanism 210 is also further operable to rotate the machining mechanism 204 around the central point W such that the machining mechanism 204 moves in a non-linear or a circular path.

The rotating build platform 206 may be a rigid and ring-shaped or annular structure (i.e. with an inner central hole) configured to rotate 360° around the center of rotation W. The rotating build platform 206 may be secured to an end mount of a motor 212 (e.g. via an actuator 214) that is operable to selectively rotate the rotating build platform 206 around the center of rotation W such that the build platform 206 moves in a circular path. The motor 212 may be further secured to a stationary support structure 216. The motor may also be located elsewhere near the apparatus and mechanically connected with the build platform via a belt for translating motion of the motor to the build platform.

Further to shaping of an object as it is being simultaneously additively built, the machining mechanism in accordance with the present invention may be further configured to cut and remove the outer build wall surrounding the built object, as depicted in FIGS. 2B and 2C. In this aspect, the cutting mechanism 204 is shown positioned near the edge of the outer build wall 209. The cutting mechanism 204 may in some cases be placed in a stationary manner against the build wall 209, and the rotation of the build plate may, along with the action of the cutting mechanism 204, remove material from the build wall until it is completely separated from the build platform 206. The cutting mechanism 204 may also be used to separate the object 203 and inner wall 207, if any, from the build platform 206.

FIG. 2C shows a top down view of the apparatus 200 shown in FIGS. 2A and 2B. The rotational direction of the build platform 206 is shown with reference to curved arrows "r". The build unit 202 may be translated along the "x" axis as shown by the dashed boxes indicating movement along different radial positions along x-crossbeam 201X. In one aspect, the build unit may be moved along the "x" axis while held in a fixed position intersecting the center of the circular build plate 206. In this way, the rotational movement of the build platform allows the build unit 202 to operate along a circular build path as the build plate 206 and object 203 rotate beneath. In some cases movement along the "y" axis may be desirable as well. For example, in one case movement along the "x" and "y" axes are used to build portions of the object 203 while the build platform 206 is prevented from rotation.

The cutting mechanism 204 is shown in this view attached to a second x-crossbeam 210X. The cutting mechanism 204 is shown positioned near the build wall in order to remove the build wall after formation of the object 203 is complete. The cutting mechanism may also be used to remove the object 203 from the build plate. Preferably, the cutting mechanism is held in place with force against the structure being cut while the build plate rotates in the direction "r" to remove material from the structure being cut. After removal of the build wall 207, any number of means may be utilized to remove powder between the object and the build wall. As discussed above, the build plate may include powder collection channels (not shown) that allow safe and efficient removal of powder.

Alternatively, the build unit 202 or machining unit 204, or both, may be mounted on a pre-existing positioning mechanism of a vertical turning lathe. Such systems typically allow movement in the vertical direction as well as translation along the radius of the circular rotating build platform.

Figure 3:
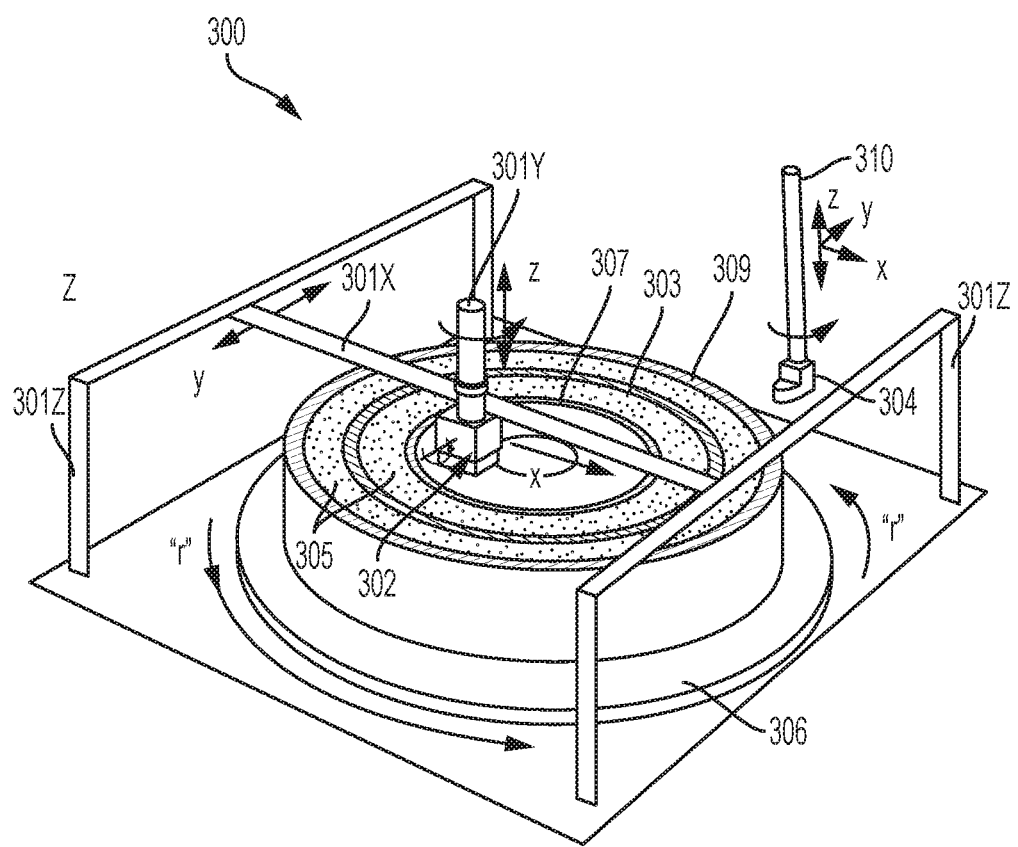
FIG. 3 is a perspective view of a manufacturing apparatus in accordance an embodiment of the invention.

FIG. 3 shows a manufacturing apparatus 300 in accordance with another aspect of the present invention. The build unit 302 is attached to a gantry having "z" crossbeams 301Z, "x" crossbeam 301X and "y" crossbeam 301Y (partially shown). The build unit 302 can be rotated in the x-y plane as well as the z-plane as shown by the curved arrows in FIG. 3. In this embodiment, the cutting mechanism 304 is attached to a support arm 310 that is provided separately from the gantry. The arm 310 may be a component of a vertical turning lathe. The object being built 303 on the rotating build platform 306 is shown in a powder bed 305 constrained by an outer build wall 309 and an inner build wall 307.

FIG. 4 shows a side view of a manufacturing apparatus 400 including details of the build unit 402, which is pictured on the far side of the build platform. The mobile build unit 402 includes an irradiation beam directing mechanism 424, a gas-flow mechanism 426 with a gas inlet 428 and gas outlet 430 providing gas flow to a gas flow zone 432, and a powder recoating mechanism 434. Above the gas flow zone 432, there is an enclosure 436 that contains an inert environment 438. The powder recoating mechanism 434, which is mounted on a recoater plate 440, has a powder dispenser 442 that includes a back plate 444 and a front plate 446. The powder recoating mechanism 434 also includes at least one actuating element 448, at least one gate plate 450, a recoater blade 454, an actuator 452 and a recoater arm 456. In this embodiment, the actuator 452 activates the actuating element 448 to pull the gate plate 450 away from the front plate 446, as shown in FIG. 4. There is also a gap 464 between the front plate 446 and the gate plate 450 that allows the powder to flow onto the rotating build platform 406 when the gate plate 450 is pulled away from the front plate 446 by the actuating element 448.

FIG. 4 shows the build unit 402 with the gate plate 446 at an open position. The powder 418 in the powder dispenser 442 is deposited to make a fresh layer of powder 458, which is smoothed over a portion of the top surface (i.e. build or work surface) of the rotating build platform 406 by the recoater blade 454 to make a substantially even powder layer 460 which is then irradiated by the irradiation beam 462 to a fused layer that is part of the printed object 420. In some embodiments, the substantially even powder layer 460 may be irradiated at the same time as the build unit 402 is moving, which allows for a continuous operation of the build unit 402 and hence, a more time-efficient production of the printed or grown object 403. The object being built 403 on the rotating build platform 306 is shown in a powder bed 405 constrained by an outer build wall 409 and an inner build wall 407.

FIG. 5 shows a top view of a selective powder recoating mechanism 534, a machining mechanism 504 and a portion of the corresponding rotating build platform 506 according to an embodiment of the invention. The selective powder recoating mechanism 534 has a powder dispenser 542 with only a single compartment containing a raw material powder 518, though multiple compartments containing multiple different material powders are also possible. There are gate plates that are each independently controlled by the actuators 552A, 552B, 552C. FIG. 3 shows all of the gate plates 550A, 550B, 550C being held in an open position to dispense powder 518 into the build area 566, and the deposited powder is then smoothed out or leveled by the recoater blade (not shown in this view). The selective powder recoating mechanism 534 also may have a recoater arm 556. In this particular embodiment, the rotating build platform 504 is shown as having an outer build wall and an inner build wall 507 which are further discussed below.

Advantageously, a selective recoating mechanism according to an embodiment of the present invention allows precise control of powder deposition using powder deposition device (e.g. a hopper) with independently controllable powder gate plates as illustrated, for example, in FIG. 5 (gate plates 550A, 550B and 550C). The powder gate plates are controlled by at least one actuating element which may be, for instance, a bi-directional valve or a spring. Each powder gate can be opened and closed for particular periods of time, in particular patterns, to finely control the location and quantity of powder deposition. The powder dispenser 542 may contain dividing walls so that it contains multiple chambers, each chamber corresponding to a powder gate, and each chamber containing a particular powder material. The powder materials in the separate chambers may be the same, or they may be different. Advantageously, each powder gate can be made relatively small so that control over the powder deposition is as fine as possible. Each powder gate has a width that may be, for example, no greater than about 2 inches (in), or more preferably no greater than about ¼ in. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to an embodiment of the present invention is simpler and thus less prone to malfunctioning. It also advantageously permits the powder to come into contact with fewer parts, which reduces the possibility of contamination.

Additional details for a build unit that can be used in accordance with the present invention may be found in U.S. patent application Ser. No. 15/406,444, titled "Additive Manufacturing Using a Dynamically Grown Build Envelope,", and filed Jan. 13, 2017; U.S. patent application Ser.

No. 15/406,467, titled "Additive Manufacturing Using a Mobile Build Volume,", and filed Jan. 13, 2017; U.S. patent application Ser. No. 15/406,454, titled "Additive Manufacturing Using a Mobile Scan Area,", and filed Jan. 13, 2017; U.S. patent application Ser. No. 15/406,461, titled "Additive Manufacturing Using a Selective Recoater,", and filed Jan. 13, 2017; U.S. patent application Ser. No. 15/406,471, titled "Large Scale Additive Machine,", and filed Jan. 13, 2017, the disclosures of which are incorporated herein by reference.

In some embodiments, the positioning mechanism, the machining mechanism and the rotating build platform of an apparatus of the present invention may be incorporated in the form of a vertical turning lathe. In other words, the rotating bed of the vertical turning lathe serves as the build platform for the powder-based additive manufacturing. A vertical turning lathe (VTL), which is also called a "vertical turret lathe" or "turret lathe" is an industrial scale machine that carries out a variety of machining processes on a workpiece that is placed on a horizontal rotating bed, preferably in at least a semi-automated format via numerical control (NC), more preferably computer numerical control (CNC). Descriptions of components and operating mechanisms of vertical turning lathes can be found in at least U.S. Pat. Nos. 5,751,586 and 5,239,901, which are each incorporated herein by reference in its entirety.

Figure 6:
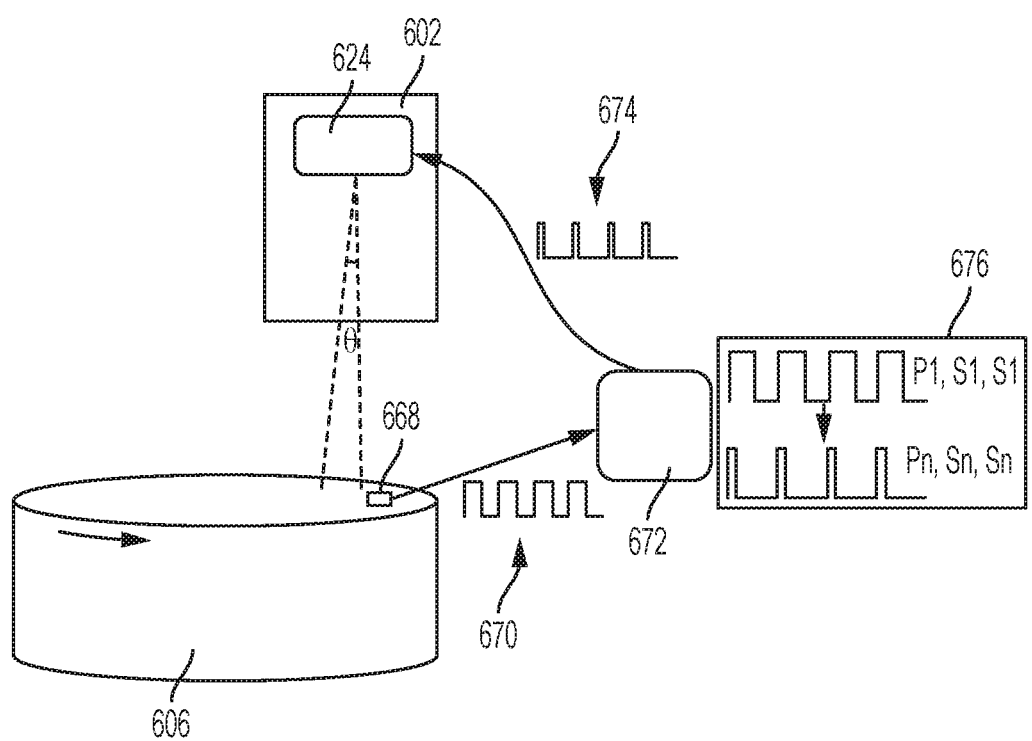
FIG. 6 shows the calibration of the irradiation beam to a known constant rotational speed of a pre-existing vertical turning lathe.

As shown in FIG. 6, when a pre-existing vertical turning lathe having a rotating bed 606 is combined with a mobile build unit 602 to implement a manufacturing method of the present invention, one or more rotary encoders 668 (visual or sensor), which may be attached to any rotating component of the rotating build platform 606, are deployed to measure and determine the rotational speed of the rotating build platform 606, e.g. the periphery of the rotating build platform 606. The rotary encoder then sends a series of pulse trains 670 (or pulse waves) corresponding to the measured constant speed to a computing device 672, which interprets the pulse trains received to determine the constant speed. Alternatively, the rotary encoder 668 has a processing circuitry that is capable of determining the rotational speed. Once the constant speed has been determined, the rastered vectors 674 controlling the intensity, speed and the spacing of the beam irradiation (laser or electron) of the irradiation beam directing mechanism 624 are re-parameterized or calibrated on the fly by the computing device 672, e.g. by a microprocessor using one or more suitable timing algorithms 676, to accommodate the bed rotating speed. This calibration results in a constant metallurgy for a given part of the built object regardless of what the constant rotating speed of the bed is, and ultimately allows the build unit containing the irradiation beam directing mechanism to be combined with a pre-existing vertical turning lathe of any rotating bed speed and produce the same object regardless of the make, model or condition of the pre-existing lathe.

Figure 7:
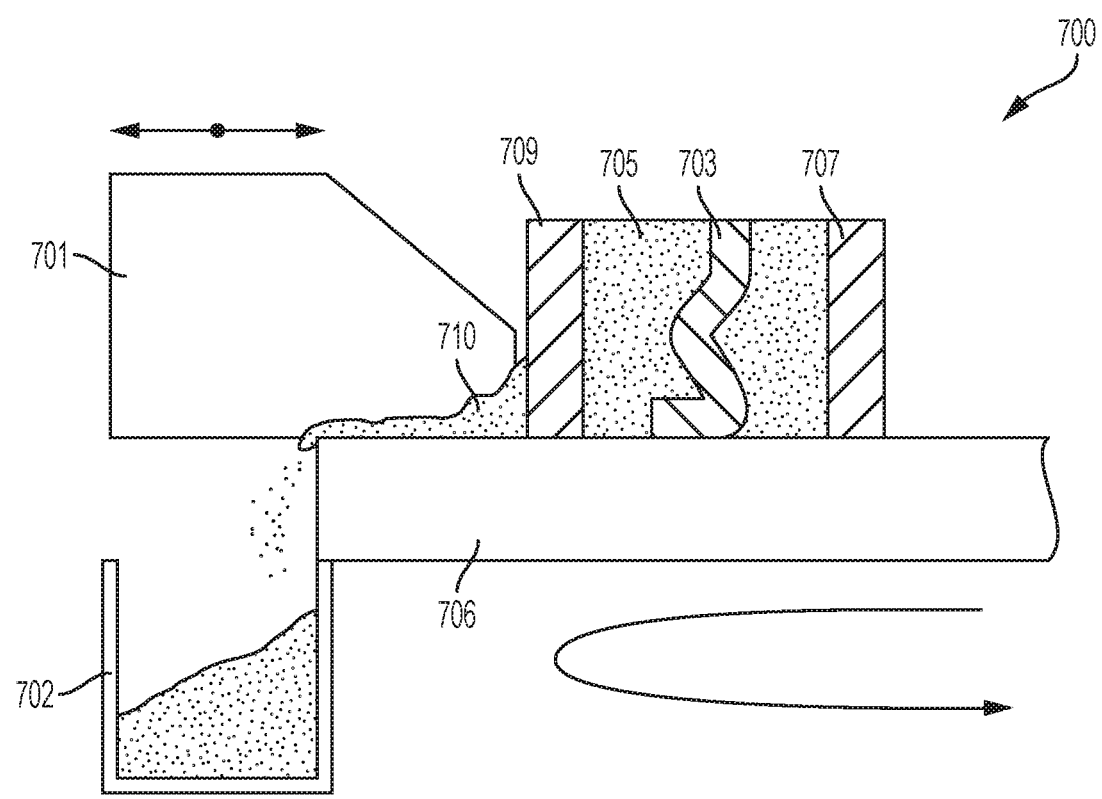
FIG. 7 shows an expanded view of the powder recovery system of a manufacturing apparatus in accordance with an embodiment of the invention.

FIG. 7 shows a side view of a manufacturing apparatus 700 in accordance with an embodiment of the invention, which includes a powder recovery mechanism 701. The powder recovery mechanism is positioned adjacent to the outer build wall 709 and, in conjunction with the rotary movement of the build plate 706, scrapes powder overflow 710 built up on the outside of the wall 709 above the build plate into a powder receptacle 702. A similar power recovery mechanism may be placed above the build plate against the interior built wall 709 to scrape powder into an interior recovery bin (not shown) through a cut-out (not shown) in the build plate. In some embodiments, the powder recovery mechanism 701 is attached to the periphery of the rotating build platform 706 and is stationary relative to the build platform. The object being built 703 on the rotating build platform 706 is shown in a powder bed 705 constrained by the outer build wall 709 and the inner build wall 707.

Representative examples of suitable powder materials can include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of manufacturing at least one object, comprising:
   (a) rotating a build platform around a z-axis, the z-axis being perpendicular to an x-y plane that is parallel to the build platform;
   (b) depositing powder from at least one build unit, wherein the at least one build unit comprises a powder delivery mechanism, a powder recoating mechanism and an irradiation beam directing mechanism;
   (c) irradiating at least one selected portion of the powder by an irradiation beam to form at least one fused layer; and
   (d) repeating at least steps (b) and (c) to form the at least one object, wherein the powder delivery mechanism is calibrated based on a measured rotational speed of the build platform.

2. The method according to claim 1, wherein a speed of a laser beam or an electron beam of the irradiation beam directing mechanism is determined by the measured rotational speed of the build platform.

3. The method according to claim 2, further comprising repeating at least step (a) to form the at least one object.

4. The method according to claim 3, further comprising leveling the at least one selected portion of the powder.

5. The method according to claim 4, wherein the irradiation beam directing mechanism is recalibrated simultaneously with the build platform rotating.

6. The method according to claim 5, further comprising machining the at least one object.

7. The method according to claim 1, wherein the measured rotational speed is determined using one or more rotary encoders attached to the build platform, wherein the irradiation beam directing mechanism is calibrated based on the measured rotational speed of the build platform, and wherein the irradiation beam directing mechanism is recalibrated simultaneously with the build platform rotating.

8. The method according to claim 1, wherein the at least one selected portion of the powder is irradiated with a laser beam or an electron beam at an angle that is perpendicular to a build area that is parallel to the build platform.

9. The method according to claim 1, wherein depositing powder from the at least one build unit comprises depositing powder into a build area that is parallel to the build platform.

10. The method according to claim 1, wherein the object is selected from the group consisting of a turbine or vane shrouding, a central engine shaft, a casing, a compressor liner, a combustor liner, and a duct.

11. A method of manufacturing at least one annular object, comprising:
(a) rotating a build platform around a z-axis, the z-axis being perpendicular to an x-y plane that is parallel to the build platform;
(b) depositing powder from at least one build unit, wherein the at least one build unit comprises a powder delivery mechanism, a powder recoating mechanism and an irradiation beam directing mechanism;
(c) irradiating at least one selected portion of the powder by an irradiation beam to form at least one fused layer; and
(d) repeating at least steps (b) and (c) to form the at least one annular object, wherein at least the powder delivery mechanism and irradiation beam directing mechanism are calibrated based on a measured rotational speed of the build platform, wherein the measured rotational speed is determined using one or more rotary encoders attached to the build platform.

12. The method according to claim 11, wherein a speed of a laser beam or an electron beam of the irradiation beam directing mechanism is determined by the measured rotational speed of the build platform.

13. The method according to claim 12, further comprising repeating at least step (a) to form the at least one annular object.

14. The method according to claim 13, further comprising leveling the at least one selected portion of the powder.

15. The method according to claim 14, wherein the irradiation beam directing mechanism is recalibrated simultaneously with the build platform rotating.

16. The method according to claim 15, further comprising machining the at least one annular object.

17. The method according to claim 11, wherein the irradiation beam directing mechanism is recalibrated simultaneously with the build platform rotating.

18. The method according to claim 11, wherein the at least one selected portion of the powder is irradiated with a laser beam or an electron beam at an angle that is perpendicular to a build area that is parallel to the build platform.

19. The method according to claim 11, wherein the annular object is an aircraft component.

20. The method according to claim 11, wherein the annular object is selected from the group consisting of a turbine or vane shrouding, a central engine shaft, a casing, a compressor liner, a combustor liner, and a duct.

* * * * *